Aug. 23, 1938.  W. M. HAMPTON  2,128,028
APPARATUS FOR APPLYING LIQUID MATERIAL TO GLOBULAR ARTICLES
Filed July 3, 1936
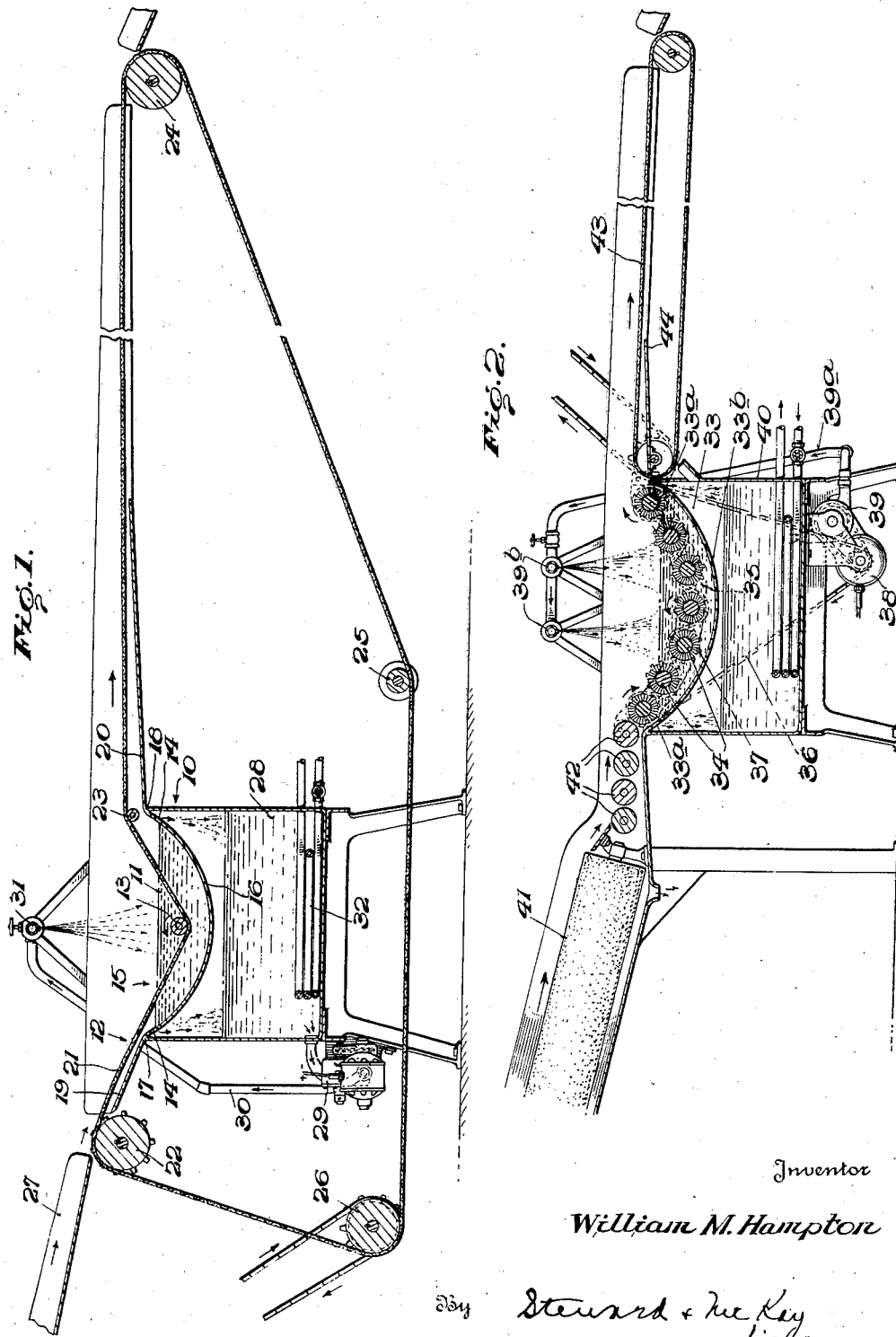
Inventor
William M. Hampton
By Steward & McKay
His Attorneys Patented Aug. 23, 1938

2,128,028

UNITED STATES PATENT OFFICE 2,128,028

APPARATUS FOR APPLYING LIQUID MATERIAL TO GLOBULAR ARTICLES

William Morgan Hampton, Winter Haven, Fla., assignor to Brogdex Company, Pomona, Calif., a corporation of Florida Application July 3, 1936, Serial No. 88,849

7 Claims. (Cl. 91—46)

This invention relates generally to apparatus for applying liquid material to globular articles.

Although the invention is capable of wide application in treating or applying liquid material to many different articles of generally globular shape, it is particularly useful in the preparation for market of fresh fruit and vegetables, such as oranges, lemons, grapefruit, apples, tomatoes, and the like, all of which may, for convenience, be generically referred to as "fruit".

The preparation for market of fresh fruit, especially citrus fruit, usually involves applying thereto a protective and preservative composition or liquid comprising a waxy material, such as paraffin, and a solvent or liquid vehicle, with or without other ingredients. The composition is distributed over the surface of the fruit to provide a coating which protects and preserves it and in general maintains its original appearance, soundness, freshness and flavor for a long time. The apparatus of the present invention enables this treatment to be carried out in a simple economical and effective manner. Accordingly, in explaining the principles of the invention, reference will be made for the sake of a concrete illustrative example, to novel apparatus particularly useful in treating or applying liquid material to citrus fruit, but it is to be understood, as previously emphasized, that the invention is not limited to this particular use.

One of the objects of this invention is the provision of means for applying liquid material to fruit and other articles of generally globular shape in a comparatively small, compact, inexpensive structure which will operate to quickly and uniformly distribute the material over the entire surface of each article with a minimum amount of handling.

Another object of the invention is the provision of means for applying liquid material to fruit and other articles of generally globular shape in such manner as to require the use of only a relatively small quantity of liquid at any given time.

Other objects and novel features and advantages of the invention will become apparent from the following description taken in connection with the accompanying drawing which illustrates practical forms of apparatus embodying the invention, it being understood that the description of these specific embodiments is merely illustrative and not restrictive and that various changes in arrangement and details can be made without departing from the spirit and scope of the invention as set out in the appended claims.

These objects are accomplished, in accordance with the principles of the invention, by apparatus which comprises a relatively shallow container or dip tank adapted to contain a relatively small quantity of liquid material, means for conveying or feeding articles into and through said tank, and rotatable means over which such articles pass operable to engage and cause turning movement of said articles. Most desirably, the apparatus also includes means cooperating with said rotatable means for ensuring operative contact of such articles therewith as they pass through the tank.

In order further to explain the underlying principles of the invention, certain practical embodiments thereof are shown in the accompanying drawing and described in detail hereinafter by way of illustrative examples only and not as in any way limiting the broad scope of the invention.

In this drawing:

Fig. 1 is a vertical longitudinal sectional view of one form of apparatus embodying the invention, and Fig. 2 is a similar view of a modified form.

Referring first to the embodiment of the invention illustrated in Fig. 1, the novel apparatus there shown comprises generally a relatively shallow container or dip tank 10 adapted to contain a relatively small quantity of liquid material 11, means indicated generally at 12 for conveying or feeding articles into and through said tank, rotatable means 13 over which such articles pass for engaging and causing turning movement of said articles, and means 14 for maintaining a depth of liquid material above said rotatable means insufficient to permit articles passing through said tank to float over said rotatable means out of contact therewith.

One of the important features of this invention resides in the use of a tank of such form and arrangement, in combination with the article conveying or advancing means, that it is necessary to use only a relatively very small body or volume of liquid material in operating the apparatus. Various cooperative arrangements of the tank and the article conveying or advancing means can be made to attain this end. In the illustrative example, dip tank 10 comprises a comparatively shallow open-top pan or receptacle provided with substantially upright sides 15, only one of which is shown, and a concave substantially semi-cylindrical trough-shaped bottom portion 16 which extends between the two end walls 17, 18 and curves or slopes from the top edges downwardly toward the middle or mid-portion of the tank so that the deepest part is substantially midway between the ends. Extending laterally from the rounded top edges of ends 17, 18 are inclined aprons or drip pans, 19, 20, respectively, which slope toward and drain into dip tank 10 for reasons which will be explained hereinafter.

The article conveying or advancing means 12, which may be of any appropriate character, is here illustrated as comprising an endless link belt or woven wire web 21 which passes over a roller 22 at the feed-in end of the dip tank 10, under a smaller idler roll 13 in the bottom of the tank, then out of the opposite end of the tank and over idler roll 23, passing over drain pan 20 and around roll 24 at the discharge end of the unit, thence around roll 25 and driven roll 26 back to the roll 22 at the feed-in end of the dip tank. The upper run of the belt 21 between the rolls 22 and 23 is thus constrained to travel downwardly into the dip tank and the liquid material 11 contained therein by the idler roll 13, the belt then passing upwardly out of the tank over the roll 23. Rolls 22, 13 and 23 cause this part of the conveyor belt to assume a trough or V-shape which follows rather closely the concave trough-shaped bottom portion 16 of dip tank 10 so that it is possible to use a comparatively shallow tank containing a relatively small body or volume of coating material.

However, the principal feature which, in combination with the dip tank and conveyor, makes it possible to use a relatively small body or volume of liquid material, resides in the arrangement and action of the rotatable means comprising the idler roll 13 in the bottom of the dip tank 10, and under which the conveyor belt passes, in cooperation with the means 14 for ensuring contact of articles with said roll as they pass through the tank. The conveyor belt 21 moving in the direction of the arrows feeds the fruit or other articles, such as oranges or the like, delivered to it by feeding means such as a chute board, indicated conventionally at 27, into the dip tank at one end and advances it through the tank and the liquid material contained therein, the fruit or other articles passing out of the tank on the belt at the opposite or discharge end of the tank. As the belt travels downwardly into the tank, the fruit is dipped into the liquid material which is thus applied thereto. As the fruit moves through the tank and the liquid material it strikes and is momentarily stopped and turned over and over by the reverse rotation of the upper surface of the roll 13, induced by the travel of belt 21, provided, of course, that the depth of liquid material above said roll is insufficient to permit the fruit or other articles to float over the roll out of contact therewith. The fruit is thus smeared and entirely and uniformly covered with liquid material, even though there may be insufficient liquid material in the tank to submerge the fruit or other articles being treated.

In order to make it possible to treat articles, particularly floatable articles such as citrus fruit, with a maximum degree of efficiency and at the same time permit the use of a relatively small quantity of liquid, means are provided for ensuring contact of such articles with the roll 13 as they pass through the dip tank 10 and the liquid material 11. In the illustrative example, this means takes the form of an overflow outlet comprising a plurality of holes 14 provided in the bottom portion 16 of dip tank 10 for maintaining the proper predetermined level of liquid material in the dip tank. These holes or overflow outlets 14 are so located relative to roll 13 that the depth of liquid material thereabove is insufficient to let the fruit be floated upwardly out of contact with said roll as it passes through the liquid material, thus ensuring operative contact of the fruit with said roll.

The means for supplying liquid material to the dip tank 10 may be of any suitable character. In the desirable practical form here illustrated, liquid material is supplied to the dip tank 10 from a supply tank 28 located under dip tank 10, the arrangement being such that both tanks have the same side walls 15, and end walls 17, 18. A motor driven pump 29 removes liquid material from the supply tank and delivers it through pipe 30 to the valve-controlled spray pipe 31 which extends transversely over dip tank 10 so as to spray liquid material on the fruit as it passes through the dip tank. The amount of liquid material supplied to the dip tank is regulated so as to maintain therein a body of liquid material whose surface level is up to the overflow outlets 14. Usually a slight excess over the minimum amount required to maintain this level is supplied, the excess coating material passing through the overflow outlets 14 into the supply tank.

Means indicated generally at 32 are provided for heating and maintaining fluent the liquid material in supply tank 28, and because of the compact arrangement of the dip tank immediately adjacent to and over the supply tank, the heating means also heats the liquid material in the dip tank. In the example illustrated, heating means 32 comprises a valve controlled steam coil located in the bottom of supply tank 28, but any suitable heating means may be used.

In operating the apparatus to treat or coat fruit, the fruit (e. g. oranges) or other articles are delivered by a delivery board, elevator, belt conveyor or other feeding means, indicated conventionally at 27, to the endless conveyor belt 21 adjacent roll 22 at the feed-in end of dip tank 10. Conveyor belt 21 feeds the fruit into the dip tank and the liquid material therein, causing the fruit to dip into said liquid material. The continuous feed of fruit into the dip tank causes continuous passage of fruit through said tank. The fruit with the liquid material applied thereto passes out of the tank at the opposite or discharge end thereof and is carried by the belt to a place of discharge. After the conveyor belt leaves the dip tank, it passes over the inclined drip pan or apron 20 arranged to catch liquid material which drops from the conveyor belt and the coated fruit and conduct it back to the dip tank. During passage of the fruit through the liquid material it strikes and is momentarily stopped and turned over by the reverse rotation of the idler roll 13 in the bottom of the dip tank whereby a film of liquid material is uniformly applied over the entire surface of the fruit. The operation of the apparatus is a continuous one, the fruit to be treated or coated being fed into one end of the apparatus and the treated or coated fruit being continuously delivered at the other end.

Any coating material or composition of a freely fluent or liquid consistency suitable for the formation of the desired film-like protecting and preservative coating upon the fruit may be employed, including materials which require heat to make them freely fluent. The invention also includes the use of coating materials or compositions which require rubbing or brushing of the fruit to form the protective coating from the material applied thereto, but the invention is particularly useful in forming a protective and preservative coating upon fruit from coating materials in emulsion form applied thereto without any rubbing or brushing of the fruit. The novel apparatus is particularly adapted to such use because the coating material or emulsion is uniformly applied in a thin film to the entire surface of the fruit, thus making rubbing or brushing of the fruit to obtain a thin, uniform, film-like coating unnecessary.

In the form of apparatus illustrated in Fig. 2, the dip tank 33 is provided adjacent the bottom with a series of parallel rolls 34 journaled at their ends in arcuate metal frames 35 mounted at the sides of the dip tank and driven by a chain 36 passed over and under sprockets 37 at one end of the set of rolls, the arrangement causing the successive rolls of the set to revolve in opposite angular directions. Chain 36 is driven by an electric motor 38 which also serves to drive the pump 39 for supplying liquid material through pipe 39ª and spray pipes 39ᵇ to the dip tank from the supply tank 40. The overflow outlets 33ª provided in the bottom portion 33ᵇ of the dip tank 33 maintain the proper predetermined level of liquid material in said tank relative to the rolls 34 so that at least the lower rolls are immersed in said liquid material. The arrangement is such that the depth of liquid material maintained above at least some of the rolls is insufficient to permit articles passing through the dip tank to float over said rolls out of contact therewith. The action of rolls 34 is to give turning movement to the fruit as it is passed through the dip tank and the liquid material contained therein, similar to the action of the roll 13 in Fig. 1, but obviously the turning movement exerted by the rolls in Fig. 2 is much more extensive than in the simpler form illustrated in Fig. 1, the fruit being turned first in one direction and then in the opposite direction, as indicated by the arrows in Fig. 2. In this form of the invention, rolls 34 are brush-surfaced to give added effect to the action thereof, but obviously rolls of any suitable type may be employed within the scope of the broad invention.

In Fig. 2 the fruit is fed to the dip tank 33 over a brushing or washing machine indicated conventionally at 41 and comprising a plurality of parallel brush rolls cooperating in pairs to provide therebetween elongated runways along which the frut travels, the fruit then passing transversely over the series of driven metal rolls 42 which feed the fruit to the dip tank. In going through the dip tank and the liquid material contained therein, the fruit passes over and is engaged by the rolls 34 which cause the fruit to turn first in one direction and then in the opposite direction whereby liquid material is applied to and evenly distributed over the entire surface of each fruit. After the fruit passes through the dip tank, it is delivered to the endless woven wire belt ("link belt") conveyor 43 which delivers the fruit to a drier or other suitable place of discharge (not shown), the drain pan 44 catching and returning to the dip tank any liquid material which drops from the conveyor. Except as noted, the construction and operation of the apparatus illustrated in Fig. 2 is identical with that illustrated in Fig. 1 and previously described in connection therewith.

In both forms of the invention, the means for feeding the fruit to and carrying it away from the dip tank may obviously differ widely from the means illustrated by way of example and it is to be understood that various modifications can be made without departing from the spirit and scope of the invention as defined in the claims.

What is claimed is:

1. Apparatus for applying liquid material to globular articles comprising, a relatively shallow dip tank adapted to contain a relatively small body of liquid material, means for conveying or feeding such articles into and through said tank, rotatable means over which such articles pass for engaging and causing turning movement of said articles, and means for maintaining a predetermined level of liquid material in said tank relative to said rotatable means whereby said rotatable means is at least partially immersed in said liquid material, said rotatable means being so mounted relative to said liquid level and contiguous to said conveying or feeding means and of such diameter relative to the diameter of said articles that said articles are temporarily supported by and caused to pass over said rotatable means.

2. Apparatus for applying liquid material to globular articles comprising, a tank adapted to contain liquid material, a roll rotatably mounted in said tank adjacent the bottom thereof, conveyor means for passing such articles through said tank and over said roll, said roll being operable to engage and cause turning movement of such articles, and an overflow outlet for maintaining a depth of liquid material above said roll insufficient to permit articles passing through said tank to float over said roll out of contact therewith, said roll being mounted contiguous said conveyor means to prevent passage of articles between said roll and said conveyor means.

3. Apparatus for applying liquid material to floatable globular articles comprising, a relatively shallow dip tank adapted to contain liquid material in which said articles are adapted to float, a roll rotatably mounted in said tank adjacent the bottom thereof, an endless conveyor constrained to travel downwardly into said tank, under said roll, and upwardly out of said tank for passing such articles through said tank and over said roll, said roll being operable to engage and cause turning movement of such articles and said roll being mounted contiguous said conveyor to prevent passage of articles between said roll and conveyor, and means for maintaining a depth of liquid material above said roll insufficient to permit articles passing through said tank to float over said roll out of contact therewith.

4. Apparatus for applying liquid material to globular articles comprising, a relatively shallow dip tank having a trough-shaped bottom which slopes downwardly from the ends toward a position intermediate the ends, a roll rotatably mounted in said tank adjacent the bottom thereof, conveyor means arranged closely adjacent to and conforming with said bottom for passing such articles through said tank and over said roll, said roll being operable to engage and cause turning movement of such articles, and means for maintaining a depth of liquid material above said roll insufficient to permit articles passing through said tank to float over said roll out of contact therewith, said roll being mounted contiguous said conveyor means and of such diameter relative to the diameter of said articles so as to prevent passage of articles between said roll and said conveyor means.

5. Apparatus for applying liquid material to globular articles comprising a relatively shallow dip tank having a trough-shaped bottom which slopes downwardly from the ends toward a portion intermediate the ends, a roll rotatably mounted in said tank adjacent the bottom thereof, an endless conveyor having a portion constrained to travel downwardly into said tank, under said roll, and upwardly out of said tank and closely adjacent to and conforming with said bottom for passing such articles through said tank and over said roll, said roll being operable to engage and cause turning movement of such articles, said conveyor engaging said roll to prevent passage of articles between said roll and conveyor and to cause said roll to rotate so that the article-engaging portion of its surface moves in a direction opposite to the direction of movement of articles through the tank, and means for maintaining a depth of liquid material above said roll insufficient to permit articles passing through said tank to float over said roll out of contact therewith.

6. Apparatus for applying liquid material to globular articles comprising, a container adapted to contain liquid material and divided into compartments to provide a supply tank and a relatively shallow open-top dip tank arranged over said supply tank, a roll rotatably mounted in said dip tank adjacent the bottom thereof, conveyor means for passing such articles through said dip tank and over said roll, said roll being operable to engage and cause turning movement of such articles, means for supplying liquid material from said supply tank to said dip tank, and an overflow outlet in said dip tank discharging into said supply tank for maintaining a depth of liquid material in said dip tank above said roll insufficient to permit articles passing through said dip tank to float over said roll out of contact therewith.

7. Apparatus for applying liquid material to globular articles comprising, a relatively shallow dip tank adapted to contain liquid material, means for feeding such articles into and through said tank, a series of parallel rolls arranged to provide a substantially arcuate path over which such articles pass, said rolls being operable to engage and cause turning movement of such articles, means for rotating successive rolls in opposite directions, and means for maintaining a depth of liquid material above at least some of said rolls insufficient to permit articles passing through said tank to float over said rolls out of contact therewith.

WILLIAM MORGAN HAMPTON.